United States Patent
Ibata et al.

(10) Patent No.: US 7,598,639 B2
(45) Date of Patent: Oct. 6, 2009

(54) VIBRATION MOTOR PROVIDED WITH A THIN BLOCKING BODY OF A COMMUNTATOR'S BREAKAWAY

(75) Inventors: Eiichi Ibata, Gyeonggi-do (KR); Hyun Gi Yang, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 472 days.

(21) Appl. No.: 11/518,425

(22) Filed: Sep. 11, 2006

(65) Prior Publication Data

US 2007/0063602 A1 Mar. 22, 2007

(30) Foreign Application Priority Data

Sep. 16, 2005 (KR) .................. 10-2005-0087045

(51) Int. Cl.
*H02K 7/065* (2006.01)
(52) U.S. Cl. .......................... 310/81; 310/88
(58) Field of Classification Search ............. 310/81, 310/85, 86, 88
See application file for complete search history.

(56) References Cited

U.S. PATENT DOCUMENTS 5,459,365 A 10/1995 Yuhi 6,930,419 B1 * 8/2005 Park et al. ............. 310/81
2005/0179332 A1 8/2005 Park et al.

FOREIGN PATENT DOCUMENTS

| CN | 1655423 A | 8/2005 |
| JP | 7-123666 | 5/1995 |
| JP | 9-294352 | 11/1997 |
| JP | 2005-117772 | 4/2005 |
| JP | 2005-137146 | 5/2005 |
| KR | 20-1999-18022 | 3/2000 |
| KR | 10-0346276 | 7/2002 |
| KR | 10-0431054 | 4/2004 |
| KR | 10-2005-0072180 | 7/2005 |

OTHER PUBLICATIONS

Japanese Office Action issued on Jan. 6, 2009 in corresponding Japanese Patent Application 2006-245330.
Chinese Office Action issued on Jan. 23, 2009 in corresponding Chinese Patent Application 2006101541838.
Korean Office Action, dated Oct. 23, 2006.

* cited by examiner

*Primary Examiner*—Dang D Le

(57) ABSTRACT

The vibration motor 100 of the present invention comprises a housing 110, a rotating shaft 140 being rotatably installed in the housing 110 and having a recess 141 formed on an outer periphery thereof, a commutator 190 being fixedly combined with the shaft 140, and a blocking body 180 with a small thickness being forcibly inserted into the recess 141 and fixedly combined with the commutator 190, wherein the commutator 190 and the blocking body 180 are fixedly combined with each other by an predetermined adhesive.

9 Claims, 5 Drawing Sheets

VIBRATION MOTOR PROVIDED WITH A THIN BLOCKING BODY OF A COMMUNTATOR'S BREAKAWAY

BACKGROUND OF THE INVENTION

1. Field of the Invention

The present invention relates to a vibration motor, and more particularly, to a vibration motor provided with a blocking body of a commutator's breakaway enabling to maintain the commutator in fixed status without breakaway from a rotating shaft when an external force is applied thereon.

2. Description of the Related Art

In general, vibration motor are used to notify the users of the reception of a communication through their vibration, the motor being installed in a mobile communication device, such as mobile phones, and one of examples thereof is illustrated in FIG. 5.

As shown, a conventional motor 300 is composed of a housing 310, an output bearing 320, an opposite output bearing 330, a rotating shaft 340, a magnet 350, a coil 360, an eccentric pendulum 370, a blocking body 380, and a commutator 390.

The housing 310 is comprised of an outer housing 311 serving to an outer case of the motor 300 and an inner housing 315 being inwardly integrally extended from the outer housing 311.

The output bearing 320 is forcedly combined with the inlet portion of the housing 310, and the opposite output bearing 330 is forcedly combined with the end of the inner housing 315 opposite to the output bearing 320.

The rotating shaft 340 is installed in the inner housing 315 in order to pass through the output bearing 320 and the opposite output bearing 330 and be rotatably supported by them, and the eccentric pendulum 370 is eccentrically combined with a portion of the shaft 340 being outwardly exposed from the housing 310.

The magnet 350 is attached to an outer periphery surface of the inner housing 315, and the coil 360 is attached to an inner periphery surface of the outer housing 311 to be opposed to the magnet 350.

The blocking body 380 is forcedly combined with the shaft 340 and the commutator 390 is disposed on an outer periphery surface of the body 380.

However, in the conventional vibration motor 300, in order to obtain enough maintaining force with the rotating motor 340, the blocking body 380 should be formed to have an axially increased thickness considering non-uniform inner diameter of the body 380. Therefore, the length of the magnet 350 should be decreased as much as the increased thickness of the body 380 in the limited space, whereby bring to deterioration of a magnetic circuit and block for enhancing characteristic of the motor 300.

SUMMARY OF THE INVENTION

Accordingly, the present invention is directed to a vibration motor that substantially obviates one or more problems due to limitations and disadvantages of the related art.

One object of the present invention is to provide a vibration motor enabling to obtain sufficient maintenance forces between a rotating shaft and a blocking body even the decreased thicknesses of the blocking body by forming recess on the rotating shaft and forcibly inserting the blocking body into the recess.

Another object of the present invention is to provide a vibration motor enabling to enhance characteristic thereof by increasing the length of the magnet in the limited space using a blocking body having a decreased length.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the present invention, as embodied and broadly described herein, a vibration motor provided with a thin blocking body of a commutator's breakaway comprising: a housing; a rotating shaft being rotatably combined with the housing and having a recess formed on an outer periphery thereof; a commutator being fixedly combined with the shaft, and a blocking body having a decreased thickness, being forcibly inserted into the recess and being fixedly combined with the commutator.

Wherein, the blocking body may be fixedly combined with the commutator by a predetermined adhering means.

Further, the commutator may have convex protrusions formed on an inner periphery surface thereof and the blocking body may have concave recesses corresponding to the protrusions formed on an outer periphery surface thereof, wherein, the commutator and the body may be combined with each other so as to combine the protrusion and the recess in closely contact.

Further, the commutator may be integrated with the blocking body by insert molding.

Wherein, the blocking body may have an oppressed recess adjacent to an inner periphery surface, when the oppressed recess is pressed, at least portion of the inner periphery surface adjacent to the oppressed recess may be forcibly inserted into the insert recess of the shaft.

Further, the blocking body may be formed to have a thickness of 0.15 mm.

It is to be understood that the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention are incorporated and constitute as a part of this application, illustrate embodiment(s) of the invention and together with the descriptions serve to explain the principle of the invention. In the drawings.

DETAILED DESCRIPTION OF THE INVENTION

Figure 1:
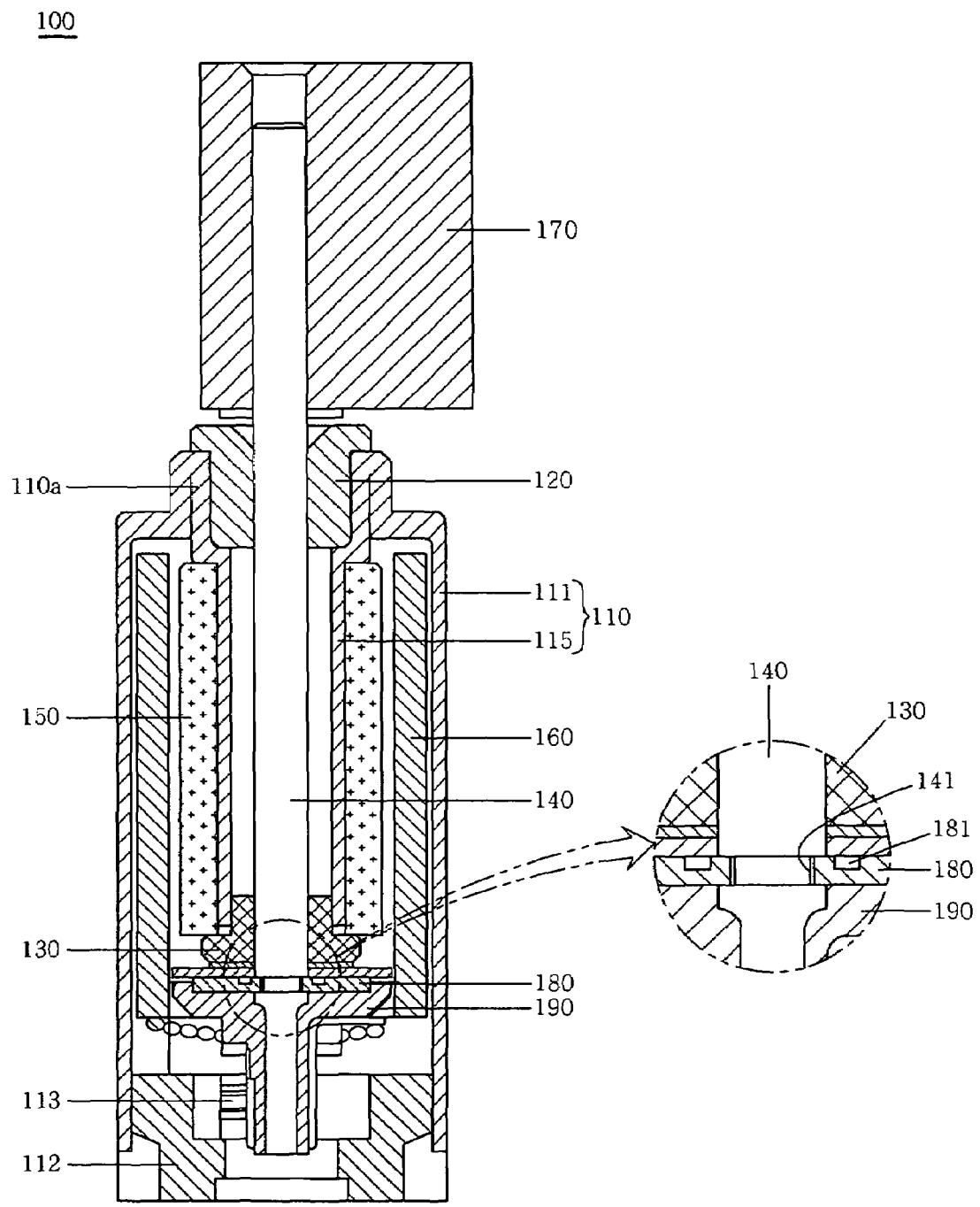
FIG. 1 is a cross-sectional view schematically illustrating a vibration motor according to one preferred embodiment of the present invention.

Reference will now be made in detail to the preferred embodiments of the present invention, examples of which are illustrated in the accompanying drawings.

First of all, with reference to FIG. 1, a vibration motor 100 according to one preferred embodiment of the present invention will be explained in detail.

As shown, the vibration motor 100 comprises a housing 110, an output bearing 120, an opposite output bearing 130, a rotating shaft 140, a magnet 150, a coil 160, an eccentric pendulum 170, a blocking body 180 and a commutator 190.

The housing 110 serves to receive all the elements of the motor 100, and it has an outer housing 111 and an inner housing 115.

The outer housing 111 has a hollow cylindrical shape and serves an outer case of the motor 100. And, the housing 111 has an open portion fixed with a base 112 therein and the base 112 is provided with a brush 113 installed thereon.

The inner housing 115 is inwardly integrally extended from the outer housing 111 so as to be shorter than the outer housing 111. Also, a bending portion connecting the outer housing 111 to the inner housing 115 serves an inlet portion 110a of the housing 110.

The output bearing 120 serves to rotatably support the rotating shaft 140, and it is forcibly inserted into the inlet portion 110a of the housing 110 in order to be exposed outside.

The opposite output bearing 130 serves to rotatably support the rotating shaft 140 together with the output bearing 120, and it is combined with the inner housing 115, more particularly, with an inner periphery surface of the housing 115 to be closely contacted.

The rotating shaft 140 serves to rotate the eccentric pendulum 170, and it is installed in the inner housing 115 so as to pass through the output bearing 120 and the opposite output bearing 130 and be rotatably supported by them. Wherein, the shaft 140 has at least outwardly exposed portion thereof and is disposed without contact with the inner housing 115 by being supported by the bearings 120 and 130, whereby the shaft 150 and the inner housing 115 having a narrow gap therebetween.

And, as shown in enlarged with dotted lines, the shaft 140 has a recess 141 formed along the outer periphery thereof to have a predetermined width.

The hollow cylindrical magnet 150 having a hollow cylindrical shape serves to form the magnetic circuit, and it is fixedly attached on the outer periphery surface of the inner housing 115.

The coil 160 serves to form the magnetic circuit together with the magnet 150 by applied the external electrical power, and it is combined with the housing 110, more particularly, with an inner periphery surface of the outer housing 111 to be opposed to the magnet 150 with a predetermined gap. At this time, the coil 160 is extended up to the outer periphery of the commutator 190.

The eccentric pendulum 170 serves to generate vibration through the rotation thereof, and it is eccentrically combined with the outwardly exposed portion of the shaft 140 from the housing 110.

The blocking body 180 serves to prevent disconnecting the commutator 190 from the shaft 140, and it is forcibly combined with the shaft 140 so as to be positioned below the bearing 130.

And, the body 180 has an annular shape with a predetermined width, as shown in enlarged view with dotted lines, and it has an oppressed recess 181 formed on a portion thereof adjacent to the shaft 140. Wherein, the oppressed recess 181 is, even not shown, wholly formed along the circumference of the body 180.

The commutator 190 serves to apply an external electrical power to the coil 160, and it is fixedly combined with the shaft 140 and the body 180 by means of the predetermined adhesive means so as to contact with the brush 113. Wherein, the commutator 190 is disposed to contact an inner periphery surface thereof with at least a portion of the outer periphery surface of the blocking body 180.

Figure 2A:
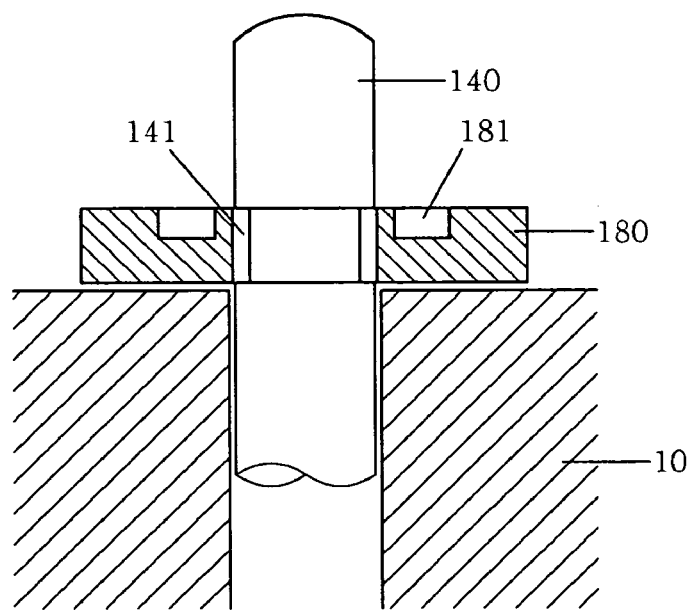
FIGS. 2a and 2b are a partial cross-sectional view schematically illustrating a process of forcibly inserting the blocking body into the rotating shaft of FIG. 1.
Figure 2B:
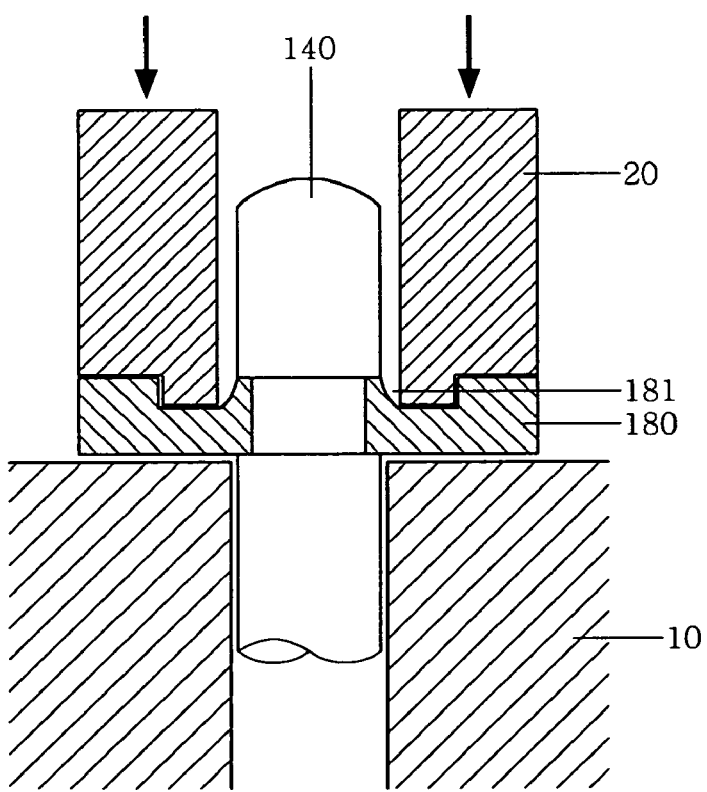

The blocking body 180 of the above described vibration motor 100 is combined as shown in FIGS. 2a and 2b.

First, as shown in FIG. 2a, the blocking body 180 is forcibly inserted into the rotating shaft 140 until it reaches to the recess 141, and then the body 180 is put on a solid block 10.

Next, as shown in FIG. 2b, a pressing body 20 having a protrusion corresponding to the oppressed recess 181 is shifted toward in the arrow direction to press the blocking body 180, more particularly, the oppressed recess 181 of the blocking body 180. At this time, the portion of the body 180 adjacent to the shaft 140 is forcibly inserted into the recess 141, and thus, the blocking body 180 is fixedly combined with the shaft 140.

Figure 3:
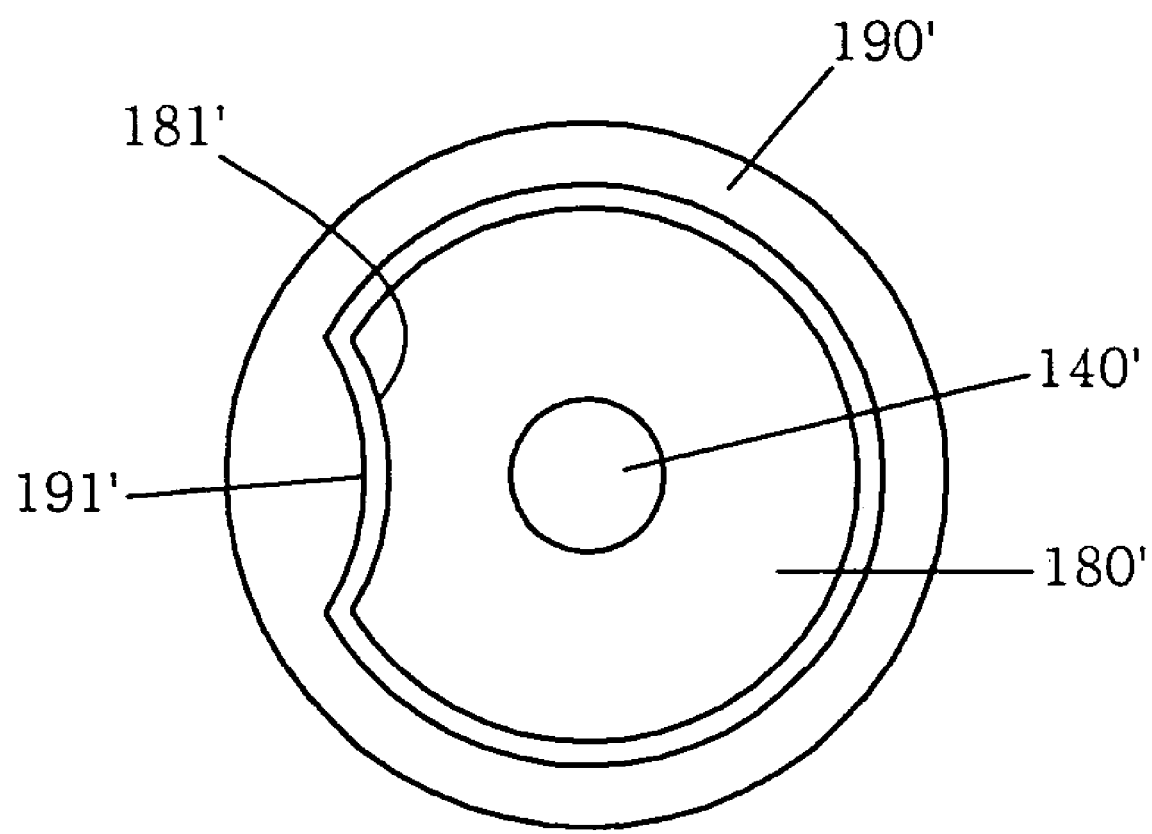
FIG. 3 is a partial plane view schematically illustrating modification of the blocking body of FIG. 1.

The blocking body 180 shown in FIG. 1 is formed with an annular shape, but alternatively, the body 180 may be modified as FIG. 3.

As shown in FIG. 3, the blocking body 180' forcedly combined with the rotating shaft 140 has a concave recess 181' formed on the outer periphery thereof, and the commutator 190' has a convex protrusion 191' corresponding to the concave recess 181' and formed on an inner periphery surface thereof adjacent to the body 180'. Therefore, the blocking body 180' does not rotate with respect to the commutator 190' by combining the concave recess 181' of the body 180' with the convex protrusion 191' of the commutator 190'.

Figure 4:
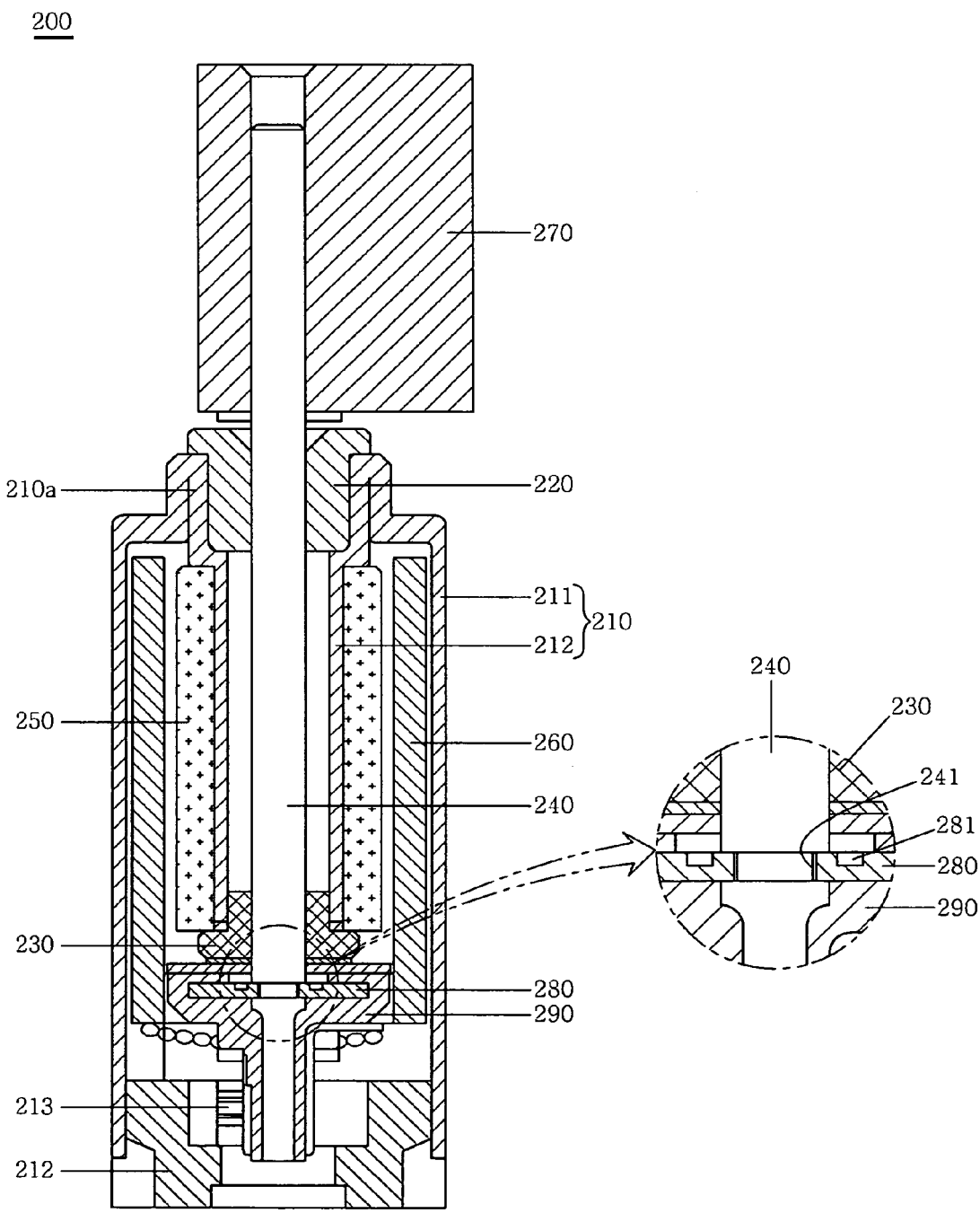
FIG. 4 is a cross-sectional view schematically illustrating a vibration motor according to another preferred embodiment of the present invention.
Figure 5:
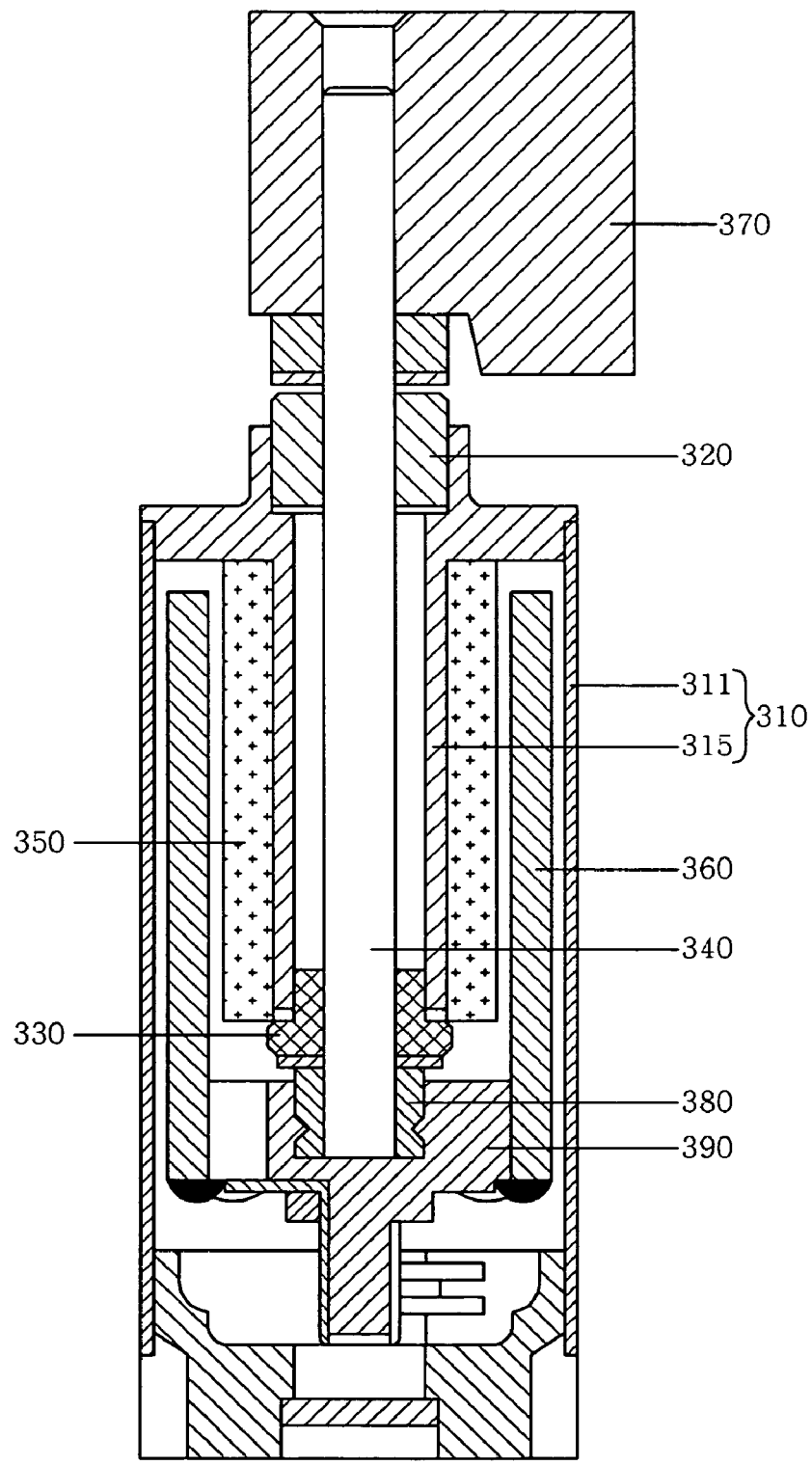
FIG. 5 is a cross-sectional view schematically illustrating a conventional vibration motor.

Next, a vibration motor 200 according to another embodiment of the present invention will be explained in detail with reference to FIG. 4.

As shown, the vibration motor 200 comprises a housing 210, an output bearing 220, an opposite output bearing 230, a rotating shaft 240, a magnet 250, a coil 260, and an eccentric pendulum 270, which are substantially the same as to those described in the foregoing embodiment. The explanation will be accomplished for only different elements from the foregoing embodiment, and the explanation for the same elements will not accomplished.

The blocking body 280 serves to prevent disconnecting a commutator 290 from the shaft 240, and it is forcibly combined with the shaft 240 so as to be positioned below the opposite output bearing 230.

And, the body 280 having an annular shape with a predetermined width, as shown in enlarged view with dotted lines, has an oppressed recess 281 formed on a portion thereof adjacent to the shaft 240, and the adjacent portion is forcibly inserted into the recess 241 formed along the outer periphery of the shaft 240. Wherein, the oppressed recess 281 is, even not shown, wholly formed along the circumference of the blocking body 280.

The commutator 290 serves to apply an external electrical power to the coil 260, and it is integrated with the blocking body 280 by insert molding. Therefore, unlike the foregoing vibration motor 100, it is unnecessary for the blocking body 280 to be combined with the commutator 290 by using any adhesive means.

According to the vibration motor of the present invention, the sufficient maintenance force between a rotating shaft and a blocking body may be obtained even though the decreased thickness of the blocking body since the blocking body fixedly combined with the commutator is forcibly combined with the rotating shaft. More specifically, in prior art, the maintenance force of about 10 kgf was possibly obtained by a blocking body having about 0.8 mm thickness, meanwhile, in the present invention, the maintenance force of about 19 kgf is possibly obtained by a blocking body having about 0.15 mm thickness.

Also, on this wise, the length of the magnet may be greatly increased in the limited space by greatly decreasing the thickness of the blocking body, whereby the characteristics of the motor enabling to be enhanced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A vibration motor provided with a thin blocking body of a commutator's breakaway, the motor comprising:
   a housing;
   a rotating shaft being rotatably combined with the housing and having a recess formed on an outer periphery thereof;
   a commutator being fixedly combined with the shaft; and
   a blocking body being forcibly inserted into the recess and fixedly combined with the commutator, the blocking body having small thickness,
   wherein the commutator has a convex protrusion formed on an inner periphery surface thereof and the blocking body has a concave recess corresponding to the protrusion formed on an outer periphery surface thereof, the commutator and the blocking body being combined with each other so as to the protrusion and the recess be closely contact.

2. The motor according to claim 1, wherein the blocking body is fixedly combined with the commutator by using a predetermined adhesive means.

3. The motor according to claim 2, wherein the blocking body has an oppressed recess formed adjacent to an inner periphery surface thereof, and when the oppressed recess is pressed, at least portion of the inner periphery surface thereof adjacent to the oppressed recess is forcibly inserted into the recess of the shaft.

4. The motor according to claim 2, wherein the blocking body has a thickness of 0.15 mm.

5. The motor according to claim 1, wherein the blocking body has an oppressed recess formed adjacent to an inner periphery surface thereof, and when the oppressed recess is pressed, at least portion of the inner periphery surface thereof adjacent to the oppressed recess is forcibly inserted into the recess of the shaft.

6. The motor according to claim 1, wherein the blocking body has a thickness of 0.15 mm.

7. The motor according to claim 1, wherein the commutator is integrated with the blocking body by insert molding.

8. The motor according to claim 7, wherein the blocking body has an oppressed recess formed adjacent to an inner periphery surface thereof, and when the oppressed recess is pressed, at least portion of the inner periphery surface thereof adjacent to the oppressed recess is forcibly inserted into the recess of the shaft.

9. The motor according to claim 7, wherein the blocking body has a thickness of 0.15 mm.

* * * * *

UNITED STATES PATENT AND TRADEMARK OFFICE
CERTIFICATE OF CORRECTION

PATENT NO. : 7,598,639 B2
APPLICATION NO. : 11/518425
DATED : October 6, 2009
INVENTOR(S) : Eiichi Ibata et al.

It is certified that error appears in the above-identified patent and that said Letters Patent is hereby corrected as shown below:

Title page, Column 1 (Title), Line 3, change "COMMUNTATOR'S" to --COMMUTATOR'S--.

Column 1, Line 3, change "COMMUNTATOR'S" to --COMMUTATOR'S--.

Signed and Sealed this

Sixteenth Day of March, 2010

David J. Kappos
*Director of the United States Patent and Trademark Office*